United States Patent [19]

Osmond et al.

[11] 3,935,155

[45] Jan. 27, 1976

[54] POLYMER MANUFACTURE

[75] Inventors: Desmond Wilfrid John Osmond, Windsor; Morice William Thompson, Maidenhead, both of England

[73] Assignee: Imperial Chemical Industries Limited, London, England

[22] Filed: Apr. 5, 1973

[21] Appl. No.: 348,142

[30] Foreign Application Priority Data

Apr. 14, 1972 United Kingdom............. 17250/72

[52] U.S. Cl.... 260/34.2; 260/31.2 R; 260/31.2 XA; 260/32.8 R; 260/33.2 R; 260/33.4 R; 260/33.6 R; 260/33.6 UA; 260/857 PA; 260/857 G; 260/857 UN; 260/873
[51] Int. Cl.²............... C08K 5/01; C08L 67/00; C08L 77/00; C08L 79/08
[58] Field of Search............. 260/23.2, 836, 33.6 R, 260/857 R, 857 G, 857 PA, 857 UA, 860, 873

[56] References Cited
UNITED STATES PATENTS

| | | | |
|---|---|---|---|
| 3,317,635 | 5/1967 | Osmond et al..................... | 260/34.2 |
| 3,383,352 | 5/1968 | Duell et al......................... | 260/34.2 |
| 3,532,663 | 10/1970 | Nicks et al........................ | 260/34.2 |
| 3,640,931 | 2/1972 | Clarke et al...................... | 260/34.2 |

OTHER PUBLICATIONS

Shildknecht, High Polymer Series, Vol. X, "Polymer Processes," Interscience Publishers, (N.Y.), 1956, pp. 71 & 105.

*Primary Examiner*—Allan Lieberman
*Attorney, Agent, or Firm*—Cushman, Darby & Cushman

[57] ABSTRACT

A stable dispersion of polymer in a non-solvent organic liquid is made from a monomer which is both solid and not completely soluble in the organic liquid at the polymerisation temperature, optionally in conjunction with other monomers which are appreciably soluble in the liquid medium at that temperature. The process comprises dispersing the solid monomer in the organic liquid in the presence of a specified monomer-stabilising agent so as to produce a stable dispersion of particles of mean diameter not greater than $50\mu$, and then heating the dispersion of solid monomer together with the other monomers, if any, at the polymerisation temperature in the presence of a specified polymer-stabilising agent. A single stabilising agent combining the functions of monomer-stabiliser and polymer-stabiliser may be employed. The process is applicable to the production of both addition polymers and condensation polymers.

15 Claims, No Drawings

POLYMER MANUFACTURE

This invention relates to the manufacture of polymers, more particularly to the manufacture of polymers by polymerisation of one or more monomers of which one is in a solid stable, microdisperse form.

There are several well-established procedures for the production of polymers in general. One procedure is to react the appropriate monomer or monomers in bulk, usually at elevated temperatures; another procedure is to make the polymer in solution by carrying out the polymerisation in a liquid which dissolves both the monomer or monomers and the resulting polymer. Such methods are applicable to both addition polymers and condensation polymers, in the latter case the polymerisation frequently involving the production of a by-product which is eliminated by volatilisation. In certain cases, however, neither bulk nor solution polymerisation is satisfactory because of the characteristics of the monomer. Thus the monomer may be one which is solid at room temperature but which has an excessively high melting point, or which tends to polymerise on heating at a temeprature well below its melting point, making bulk polymerisation difficult to carry out smoothly. Again, such a monomer, and the derived polymer, may be freely soluble only in liquids of an inconvenient nature, so that solution polymerisation is not an attractive alternative.

For many purposes, it is desirable to obtain polymers in a particulate or granular from rather than in bulk or as a solution; this can readily to achieved in the case of most addition polymers by the technique of aqueous emulsion polymerisation, but for condensation polymers this technique is not generally applicable because of the nature of the chemical reactions involved.

Dispersion polymerisation techniques have also been described, in which the monomer or monomers are polymerised in an organic liquid in which they are soluble but the resulting polymer is insoluble, the latter being produced as a stable dispersion in the liquid of fine particles by the expedient of having present a suitable stabilising agent. Such procedures as applied to addition polymers are described, for example, in British Pat. Nos. 941,305, 1,052,241, 1,121,611, 1,143,404 and 1,231,614. Corresponding procedures for condensation polymers are described in British Pat. Nos. 1,095,931 and 1,095,932. The need to operate in a liquid medium which dissolves the monomer or monomers places some limitation on the practical value of these procedures for condensation polymers, however, and it has alternatively been proposed to emulsify the starting material, in a molten condition, in an appropriate inert liquid in which it is insoluble, with the aid of suitable emulsifiers, and then bring about condensation polymerisation by heating the emulsion to an appropriately higher temperature, with azeotropic elimination of any by-product. The polymer is again obtained in the form of particles dispersed in the liquid medium, as described in British Pat. No. 1,211,532 . Here again, the method fails when applied to monomeric materials which have a high melting point, or which tend to polymerise before the temperature required to emulsify them in the molten state is reached, or are thermally unstable in some other way.

The problems above described which are associated with the use of monomers which are solid at the polymerisation temperature any be overcome or minimised by means of the present invention.

According to the invention we provide a process for the manufacture of a stable dispersion of particles of a polymer in an inert organic liquid medium in which the polymer is insoluble by the polymerisation of one or more reactive monomers of which one monomer is solid at the temperature at which the polymerisation reaction takes place and is not completely soluble in the liquid medium at that temperature, and any remaining monomer has an appreciable solubility in the liquid medium at the polymerisation temperature, the process comprising the steps of (1) dispersing the said solid monomer in the inert organic liquid in the presence of a monomer-stabilising agent so as to produce a stable dispersion of particles of the monomer having a mean diameter not greater than $50\mu$, the stabilising agent being per se soluble in the inert organic liquid and incorporating (i) a polymeric component which is solvatable by the liquid and (ii) a grouping which is capable of becoming associated with the particles of the solid monomer and (2) heating the dispersion of solid monomer together with any remaining monomer or monomers at the polymerisation temperature, so as to bring about the polymerisation reaction, in the presence of a polymerstabilising agent which is per se soluble in the inert organic liquid and incorporates (a) a polymeric component which is solvatable by the liquid and (b) a grouping which is capable of effecting association between the polymer-stabilishing agent and the resulting polymer as the polymer is formed.

For the purposes of clarity, the solid monomer which is not completely soluble in the organic liquid medium at the polymerisation temperature is termed herein "the insoluble solid monomer", notwithstanding that it may have a finite, though very samll, solubility in the liquid. The expression "insoluble solid monomer" is intended to denote not only single solid chemical substances which by self-polymerisation can give rise to the desired disperse polymer, but also mixtures of two or more solid substances which also are incompletely soluble in the organic liquid medium and which can mutually react to form the polymer, provided that in such mixtures the constituents are intimately admixed on a scale which is small in relation to colloidal dimensions. In other words, the insoluble solid monomer may consist of a single particle species of the size range defined above, but that species need not necessarily be chemically homogeneous.

The process of the invention is suitable for the manufacture of dispersions of polymers from a single insoluble solid monomer as previously defined, or from an insoluble solid monomer together with one or more other monomers which are appreciably soluble in the organic liquid at the polymerisation temperature. Such other monomers (hereinafter termed "soluble monomers"may be either solid or liquid at the polymerisation temperature. It is applicable to both addition polymers and condensation polymers. In the case of addition polymers, where more than one monomer is employed these will normally contain polymerisable groups of the same type (for example, ethylenically unsaturated groups) and the product will be a copolymer; in the case of condensation polymers, polymerisable groups of two different but complementary types (for example hydroxyl groups and carboxyl groups) will normally be involved and, whilst these may both be present in a single monomer species it will more frequently occur that one type of group is present in one monomer and the other type of group in a second monomer. For reasons already outlined, however, the process is of greatest value in the production of dispersion of condensation polymers, where difficulty processable solid monomers are more frequently encountered than with addition polymers.

Where a soluble monomer which has an appreciable but not high solubility in the inert organic liquid and is solid at the polymerisation temperature is employed, that monomer may be present in the form of a particulate dispersion in the organic liquid; it is not essential that the particles to limited in size in the same way as the particles of the insoluble solid monomer. When a liquid monomer is employed in addition to the insoluble solid monomer, the liquid monomer may have either a limited solubility in the inert organic liquid medium or may be miscible therewith in all proportions. Where the liquid monomer has a limited solubility in the organic liquid, it may be present in the form of an emulsion.

By "an inert organic liquid" we mean an organic liquid which does not take part in the polymerisation reaction; it may be either a pure liquid or a mixture. Where the polymerisation reaction is of the condensation type in which a by-product, such as water or ethylene glycol, is eliminated, the inert organic liquid medium is preferably capable of forming an azetrope with the by-product; where the liquid medium is a mixture, it will usually suffice if one of the constituents is so capable. Where high molecular weight polymer products are required, for example, polymers suitable for fibre formation, it may be necessary to "force" the polymerisation reaction by deliberately removing the by-product from the azeotrope, e.g. by drying, freezing, or chemical methods.

The process of the invention may be employed for the manufacture of dispersions of any of the common groups of addition polymers or copolymers where these are derived from at least one insoluble solid monomer, for example monomers of the acrylic or vinyl type such as acrylamide and methacrylamide, monomers containing quaternary ammonium salt groups such as methacrylyl-oxyethyl trimethyl ammonium chloride and methacrylyloxymethyl amido ethyl imidazolindone. Such insoluble solid monomers may optionally be employed in conjunction with one or more soluble monomers if these types, for example acrylic and methacrylic acids and their lower esters, nitriles and amides, vinyl esters of monobasic acids such as vinyl acetate, and hydrocarbons such as styrene and vinyl toluene. The process may likewise be used of manufacturing dispersions of any of the wellknown groups of condensation polymers, such as polyesters, polyamides, polyurethanes, polyester amides, polycarbonates, polyimides, polyimidazoles and polyureas, where either the insoluble solid monomer alone or such a monomer in conjunction with one or more other soluble monomers, is involved and where the condensation reaction may occur either with or without the elimination of a by-product. Thus the process is of value in the manufacture of dispersions of polyesters from a high-melting polycarboxylic acid, such as adipic acid or terephthalic acid, by reaction with a polyhydroxy compound which may be liquid at the temperature of polymerisation, as for example ethylene glycol, propylene glycol, glycerol or trimethylolethane or pentaerythritol. In all of these reactions, water is eliminated as a by-product. Alternatively the process may be used for making dispersions of polyesters from a single high-melting monomer such as p-hydroxybenzoic acid, where water is again eliminated, or from a monomer such as p-acetoxybenzoic and bis-p-hydroxyphenyl terephthalate, high melting lactones or polyethers from trioxane, in which case there is no by-product eliminated. Another application to polyester manufacture involves a single reactive monomer which cannot readily be brought to the molten state without premature onset of polymerisation, as for example bis(hydroxyethyl) terephthalate, during the polymerisation of which ethylene glycol is eliminated as a by-product. Likewise, the process may be employed for making dispersions of polyamides from monomers or intermediates at least one of which is high-melting, for example adipic acid together with hexamethylene diamine, or the adipic acid salt of hexamethylene diamine (Nylon 66 salt), or the azelaic acid salt of hexamethylene diamine (Nylon 69 salt) or caprolactam; or from a monomer which has too high a polymerisation tendency from emulsification to be effected prior to reaction, such as most amino acids including 1 1-aminoundecanoic acid, where polymerisation can be carried out substantially below the melting point, thereby avoiding decomposition.

Inert organic liquids which may be used in the process will in general be liquids which are free from reactive groups of the type involved in the polymerisation reaction. Thus in many cases aliphatic or aromatic hydrocarbons will be satisfactory, these being selected for maximum convenience to have boiling points at or above the polymerisation temperature, although it is of course possible to employ liquids which boil under atmospheric pressure at temperatures below that of polymerisation, by operating in pressure equipment.

The basis of the process of the invention is the initial procurement of a stable dispersion of the insoluble solid monomer in finely divided, particulate form, and the maintaining of this stably dispersed state throughout the subsequent polymerisation reaction.

In the first stage of the process, the solid monomer is dispersed in an appropriate inert organic liquid by a grinding or milling procedure, in the presence of a suitable stabilising agent, until the mean particle size of the monomer is not greater than 50$\mu$, preferably in the range 0.1–10$\mu$. If the reactive monomers include one or more which are only moderately soluble in the liquid medium at the polymerisation temperature, it is preferred that such a monomer should be incorporated with the insoluble solid monomer during the grinding or milling process, but it may if desired be added to the dispersion of the solid monomer in the form of a separate dispersion or emulsion. A liquid or solid monomer which is freely soluble in the liquid medium may be dissolved directly in the dispersion of the solid monomer.

As already stated, the stabilising agent, wherey the insoluble solid monomer is dispersed in an inert organic liquid prior to the polymerisation reaction, is per se soluble in the liquid and incorporates a polymeric component which is solvatable in the liquid. Such a polymeric component will in general be of such a composition that, if it were a separate polymeric entity, it would be soluble in the liquid medium. Thus where the liquid medium is non-polar, for example an aliphatic hydrocarbon, the solvatable component will also require to be non-polar, for example a polymer chain of mainly hydrocarbon type such as a polymer of a long chain ester of acrylic or methacrylic acid, or of a vinyl ester of a long chain acid, or of a vinyl alkyl ether, or of ethylene, propylene, butadiene or isoprene, or of a hydroxyl group-containing long chain fatty acid, or of poly-t-butyl styrene terminated with amine, hydroxyl, carboxyl or unsaturated groups, or polyisobutylene, polybutadiene or polyisoprene terminated with amine, hydroxyl or carboxyl groups. Where the liquid medium consists mainly of aromatic hydrocarbon, somewhat shorter chain analogues of these polymers may be employed, such as polymers of methyl or ethoxyethyl methacrylate, ethyl acrylate, styrene or vinyl toluene. Where the liquid medium is weakly polar, e.g. a higher alcohol, ketone or ester, suitable solvatable components include aliphatic polyethers, polyesters from short-chain difunctional acids and alcohols, short-chain alcohol esters of acrylic or methacrylic acids, and polymers of short-chain hydroxy-acids. If a strongly polar liquid medium is employed, such as methyl or ethyl alcohol, the solvatable components may consist of polymers of acrylic or methacrylic acids, ethylene oxide or vinyl pyrrolidone, polyvinyl alcohol or polymers of glycerol or glycol mono-methacrylates.

The stabilising agent is also required to contain a grouping which is capable of becoming associated with the particles of the solid monomer, in order that the solvatable polymeric components discussed in the preceding paragraph may become effectively "anchored" to, and so stabilise, the particles in the liquid medium. Such groupings will in general be polar groups which are capable of interacting with polar groupings present in the solid monomer. For example, in the case of a monomer which is an acid, e.g. methacrylic acid, adipic acid or terephthalic acid, acid, amine, epoxide, quaternary ammonium salt, nitrile, p-nitrobenzoate, anhydride, amide, isocyanate, methylol, alkoxymethyl or hydroxyl groups may be employed to anchoring groups. Where the solid monomer is a hydroxy compound, e.g. trimethylolethane or pentaerythritol, epoxide, anhydride, amide, isocyanate, ester, methylol, alkoxymethyl or hydroxyl groups may similarly be employed as anchoring groups.

Preferably the monomer-stabilising agent contains a plurality of anchoring groups of the type described above, these forming part of, or being attached to, a polymeric backbone to which the solvatable components are also attached as pendant groups. Such stabilisers are described in British Pat. Specifications Nos. 1,123,611 and 1,143,404. It is further preferred that the polymeric backbone in such a structure should be flexible, rather than rigid, under the conditions of dispersing the solid monomer in the inert organic liquid in the presence of the stabilising agent, following the principles laid down in British Pat. Specification No. 1,206,398 in relation to the dispersion in organic liquids of pre-formed particles of polymers. As indicated in the latter specification, flexibility of the "anchor backbone" may be achieved by carrying out the step of dispersing the solid monomer at a temperature which is above the glass transition temperature of the polymeric backbone, or by choosing the composition of the backbone so that its glass transition temperature lies below the normal ambient temperature.

In the second stage of the process of the invention, the dispersion in the inert organic liquid of the insoluble solid monomer is heated at the polymerisation temperature, together with any remaining soluble monomers, and any polymerisation catalyst, if required, in the presence of a stabilising agent which is capable of stabilising in the organic liquid the particles of the resulting polymer as they are formed. The stabilising agent is required to comprise a polymeric component which is solvatable by the organic liquid and also a grouping which is capable of effecting association between the stabilising agent and the polymer formed.

The solvatable polymeric group may be of a similar type, or may even be identical with, the solvatable polymeric group present in the monomer-stabilising agent previously described. The grouping whereby the polymer-stabilising agent is caused to associate with the polymer will in general be a polar group which is capable of interacting with a polar grouping present in the polymer. It may therefore be of a similar type to the anchoring groups of the monomer-stabilising agent already referred to, whereby that agent is caused to associate with the particles of the insoluble solid monomer; indeed, where the nature of the polymerisation reaction is such that there is no great disparity in polarity between the insoluble solid monomer and the polymer formed therefrom, the same species of polar group may suffice to perform both functions. It is, however, preferred that the grouping whereby association of the polymer-stabilising agent with the polymer is effected is a polymeric grouping of similar composition to the polymer itself, which will in consequence be non-solvated by the organic liquid medium and will associate with the chains of the polymer through the usual forces of inter-molecular attraction or by actual entanglement with those chains. Such a polymeric grouping may be already present in the polymer-stabilising agent as a second polymeric component thereof but differing in characteristics from the first, or solvatable, polymeric component. Alternatively, such a grouping may be produced during the course of the polymerisation reaction by providing the polymer-stabilising agent with a reactive grouping which can participate in that reaction and so give rise to a polymer chain of similar composition to that of the main polymer, grafted on to the stabiliser molecule. The reactive grouping must be capable of reacting with a polymerisable grouping contained in at least one of the monomers from which the polymer is formed. Thus in the case where the final polymer is a polyester, the reactive grouping of the stabiliser should be capable of reacting either with hydroxyl groups or with carboxylic acid groups; it may, therefore, be a carboxyl group or a hydroxyl or amino group; where the final polymer is an additional polymer, the reactive grouping of the stabiliser may be an ethylenically unsaturated grouping.

The polymer-stabilising agent may be added to the dispersion in the organic liquid of the insoluble, solid monomer after production thereof and before heating to the polymerisation temperature is commenced. Alternatively, the polymer-stabilising agent may be initially present, along with the monomer-stabilising agent, during the formation of the dispersion of the insoluble solid monomer. In a preferred embodiment of the invention, the monomer-stabilising agent and the polymer-stabilising agent are one and the same substance, in which case the stabilising agent which is added in the first, dispersion stage of the process comprises (i) a solvatable polymeric component, (ii) a grouping capable of anchoring the agent to the particles of solid monomer, and (iii) a grouping capable of effecting association of the agent with the polymer formed, these three components having the characteristics already described. It will be apparent from what has been stated above that the groupings (ii) and (iii) may in suitable cases be identical; thus, in the production of a dispersion of a polyamide, amino groups will serve both to anchor to the monomer particles and to give rise to polymer chains capable of associating with the final polymer. In the latter case, it is desirable to ensure that the total proportion of such groups provided is adequate to perform both functions, but it is also necessary to avoid introducing so many such groups that they can bring about an appreciable degree of cross-linking of the polymer. It is further desirable to select the anchor groups and/or the reactive groups so that they do not tend to associate too strongly with themselves, otherwise undissociatable micelles of stabiliser may be produced which will considerably reduce the stabilisation efficiency. The reactive group is preferably capable of participating in the polymerisation in its early stages, so that there is stabilisation of oligomer formed as well as of higher polymer. This applies particularly in cases where a by-product is formed in a condensation polymerisation reaction, owing to the continuous change in polarity within the particles of reacting intermediates which occurs as the by-product diffuses out and escapes from the system. However, it is also significant in addition polymerisations or in condensation polymerisations when no by-product is formed, since the change in polarity within the particle in the initial stages of polymerisation may be great enough to call for simultaneous stabilisation.

Reactive groups capable of participating in the polymerisation reaction, if present in the stabilising agent, are preferably located in a portion of the stabiliser molecule which is remote from the solvatable component or from a grouping which is responsible for association with the particles of the insoluble solid monomer, and it is desirable, though not essential, that the reactive groups should be attached to such a portion of the stabiliser molecule in such a way as to be sterically readily accessible. If potentially reactive groups are present in the solvatable component of the stabiliser or in proximity to an anchoring group, they should be sterically shielded or hindered.

Types of stabilising agent useful in the process of the invention include copolymers of three different types: (i) block copolymers of the AB or ABA type, where A represents the solvatable polymeric component and B represents the polymeric grouping whereby the copolymer is associated with the particles of the final polymer; (ii) graft copolymers in which a plurality of solvatable polymeric chains are attached to a common polymeric backbone which can associate with the final polymer; and (iii) random copolymers which are as a whole soluble in the liquid medium and contain groupings which can associate with the polymer. In each of these cases there must be present groups which are capable of association with the particles of insoluble solid monomer; these may, as already indicated, be the same as the groupings which associate with the final polymer or they may be groupings specially incorporated for the purpose.

When the process of the invention is used for making condensation polymers, and more than one reactive monomer is involved in the polymerisation, the relative proportions of the monomers taken may be selected according to the principles commonly followed in bulk condensation polymerisation. That is to say, when it is desired that the final polymer should have chains terminated by groups of one of the two reactive species involved in the condensation reaction, an excess of the monomer bearing those groups will be employed, whilst if a high molecular weight polymer of fibre-forming capabilities is required, strict stoichiometry of the initial monomers will be observed. Both condensation and addition polymers produced as stable dispersions by the process of the invention may be crosslinked if desired.

In order further to illustrate the invention, some examples will now be described. Parts stated are by weight.

EXAMPLE 1

This Example illustrates the conversion of Nylon 66 salt (hexamethylene diamine adipic acid salt) to Nylon 66.

A mixture of Nylon 66 salt (130 parts), aliphatic hydrocarbon (boiling point 170°–210°C.) (100 parts), and a stabiliser solution as described below (23 parts) was charged to a ball mill and milled for 18 hours to give a fine dispersion of the salt having particle sizes in the range $0.5-3.0\mu$. The dispersion was then diluted to 40% solids content by adding further aliphatic hydrocarbon, and was thereafter heated under reflux at a vessel temperature of 173°C., using a Dean and Stark separator. After 2 hours, the quantity of water collected in the separator was 12 ml (theory, 14.5 mls.), and the reaction mixture was cooled to give a slightly flocculated dispersion of Nylon 66 in the aliphatic hydrocarbon. Particle sizes were in the range $2-5\mu$.

The stabiliser solution used in this Example was a 33% W/V solution in aliphatic hydrocarbon of a copolymer obtained by condensing poly(12-hydroxystearic acid) to a hydroxyl value of approximately 31–34 mg. KOH/g. with glycidyl methacrylate until the product had substantially zero acid value, then copolymerising the product at a ratio of 1:1 by weight with a mixture of methyl methacrylate and methacrylic acid in the proportions of 98:2.

EXAMPLE 2

The procedure of Example 1 was repeated, replacing the Nylon 66 salt by a similar quantity of Nylon 69 salt (hexamethylene diamine azelaic acid salt). A dispersion of Nylon 69 was obtained having similar characteristics to those described in Example 1.

EXAMPLE 3

The procedure of Example 1 was repeated, except that the stabiliser solution described therein was replaced by a similar amount of a 33% W/V solution in ester of a stabiliser obtained by condensing a carboxyl-terminated poly-(tert-butyl styrene) with glycidyl methacrylate and then copolymerising the product at a ration of 1:1 by weight with methyl methacrylate and methacrylic acid in the proportions of 98:2.

EXAMPLE 4

This Example illustrates the production of a dispersion of the polyamide derived from 11-aminoundecanoic acid.

A mixture of 11-aminoundecanoic acid (720 parts), aliphatic hydrocarbon (boiling point 170°–210°C.) 545 parts) and the stabiliser solution described in Example 1 (73 parts) was charged to a ball mill and ground for 21 hours. The thick millbase so obtained was thinned with a further 60 parts of the aliphatic hydrocarbon to give a thixotropic dispersion of 51.8% solids. This dispersion (210 parts) was diluted to 40% solids with aliphatic hydrocarbon and heated under reflux (180°C.) using a Dean and Stark separator. When removal of by-product water was complete, the product was a slightly flocculated dispersion of Nylon 11.

COMPARATIVE EXAMPLE A

This Example illustrates the situation in which the monomer-stabilising agent contains a polymeric backbone which is not flexible under the conditions of dispersing the solid monomer, so that although a dispersion of the monomer in the inert organic liquid is obtained, the dispersion tends to have relatively poor stability and to be thixotropic. The Example further illustrates the necessity, if stable polymer dispersions are to be obtained, of having present during the polymerisation a material which can act as a polymer-stabilising agent.

A mixture of Nylon 66 salt (50 parts), aliphatic hydrocarbon of boiling range 230°–250°C. (50 parts), aliphatic hydrocarbon of boiling range 70°–95°C. (150 parts), and a graft dispersing agent solution as described below (7.5 parts) was charged to a ball-mill and milled for 50 hours. The dispersion after milling had a particle size range of 0.5–3.0µ but it was very thixotropic.

The dispersion was heated to reflux (80°C.) and the reflux temperature raised by removing the low boiling aliphatic hydrocarbon by means of a Dean and Stark separator, high boiling aliphatic hydrocarbon being added in order to keep the solids content of the dispersion constant. The dispersion remained quite thick as the temperature increased, and at a temperature of 180°C. water was azeotroped out with the refluxing aliphatic hydrocarbon. When all the water had been removed (6.5 parts) an unstabilised, granular polymer product remained.

The graft dispersing agent used in the above procedure was a 42.4% solution, in aromatic hydrocarbon, of the product obtained by reacting poly-(12-hydroxystearic acid) with glycidyl methacrylate and copolymerising the resulting ester at a ratio of 1:1 by weight with methyl methacrylate.

COMPARATIVE EXAMPLE B

This Example illustrates the improvement achieved in the quality of the dispersion of the solid monomer, as compared with that shown in Comparative Example A, by using a monomer-stabilising agent containing a polymeric backbone which is flexible under the conditions of dispersing the monomer. In the absence of a suitable polymer-stabilising agent, however, an unstabilised product is again obtained.

A ball-mill was charged with the same ingredients as those described in Comparative Example A above, except that the graft dispersing agent solution used in that instance was replaced by an equal weight of the graft dispersing agent solution described below. After milling for 50 hours the dispersion had a particle size range of 0.5–3.0µ and showed no signs of thixotropy.

The dispersion was heated to reflux and the reflux temperature was raised using the same procedure as that described in Comparative Example A. As the temperature increased, the dispersion became de-stabilised and after the removal of water the final product was of a very similar nature to that of Comparative Example A.

The graft dispersing agent solution used in the above procedure, was similar to that used in Comparative Example A, but in this case the methyl methacrylate used in the preparation of the copolymer was replaced by an equal weight of ethyl acrylate.

EXAMPLE 5

In this Example there is illustrated the use of a stabilising agent which not only contains a polymeric backbone which is flexible under the conditions of dispersing the monomer and so effects stabilisation of the monomer dispersion, but which also contains a group which enables it to function as a polymer-stabilising agent.

A mixture of Nylon 66 salt (50 parts), aliphatic hydrocarbon of boiling range 230°–250°C.) (50 parts), aliphatic hydrocarbon of boiling range 70°–95°C. (150 parts) and a graft dispersing/stabilising agent solution as described below (7.5 parts) was charged to a ball-mill and milled for 50 hours. The dispersion obtained had a particle size range of 0.5–3.0µ and showed no signs of thixotropy.

The dispersion was heated to reflux and the reflux temperature raised using the same procedure that is described in Comparative Example A above. As the temperature increased, slight flocculation was observed but at a temperature of 180°C. re-dispersion appeared to take place. At the same time water was azeotroped off. When all the water had been removed there was some granular polymer product present, but the supernatant liquor contained a stable polymer dispersion having a particle size range of 1–2µ.

The graft dispersing agent solution used in this procedure, was similar to that used in Comparative Example A, but the methyl methacrylate used therein in the preparation of the copolymer was replaced by a mixture of ethyl acrylate and glycidyl methacrylate in the weight proportions 95.5.

EXAMPLE 6

The procedure of Example 5 was repeated, except that an equal weight of 6-amino caproic acid was used in place of nylon 66 salt. The dispersion obtained was similar to that of Example 5, with water of reaction being rapidly generated at 200°C. and complete after 30 minutes.

EXAMPLE 7

This Example illustrates the use of a stabilising agent which, like that described in Example 5, is capable of acting both as monomer-stabiliser and polymer-stabiliser, but which contains a different polymer-anchoring group from that present in the stabilising agent of Example 5.

The procedure of Example 5 was repeated, using instead of graft dispersing/stabilising agent solution there described an equal amount of the agent solution described below. The dispersion of Nylon 66 salt obtained after milling for 50 hours had a particle size range of 0.3–2.0µ and showed no signs of thixotropy. The dispersion of Nylon 66 polymer finally obtained contained a few granular particles but the greater part of the solids content was stable and had a particle size range of 1–2µ.

The graft dispersing/stabilising agent solution used in this Example was similar to that described in Example 5 but in the copolymer the ethyl acrylate-glycidyl methacrylate mixture was replaced by a 95:5 mixture of ethyl acrylate and methacrylic acid.

What we claim is:

1. A process for the manufacture of a stable dispersion of particles of a polymer selected from the group consisting of polyesters, polyamides and polyimides in an inert organic liquid medium in which the polymer is insoluble by the polymerisation of one or more reactive monomers of which one monomer is solid at the temperature at which the polymerisation reaction takes place and is capable of existing as a stable dispersion of finely divided particles in the liquid medium at that temperature, and any remaining monomer has an appreciable solubility in the liquid medium at the polymerisation temperature, the process comprising the steps of (1) dispersing the said solid monomer in the inert organic liquid in the presence of monomer-stabilising agent so as to produce a stable dispersion of particles of the monomer having a mean diameter not greater than $50\mu$, the monomer-stabilizing agent being per se soluble in the inert organic liquid and incorporating (i) a polymeric component which is solvatable by the liquid and (ii) a grouping which is capable of becoming associated with the particles of the solid monomer and (2) heating the dispersion of solid monomer together with any remaining monomer or monomers at the polymerisation temperature, so as to bring about the polymerisation reaction, in the presence of a polymerstabilising agent which is per se soluble in the inert organic liquid and incorporates (a) a polymeric component which is solvatable by the liquid and (b) a grouping which is capable of effecting association beyween the polymer-stabilising agent and the resulting polymer by reacting with a polymerizable grouping contained in at least one of the monomers from which the polymer is formed.

2. A process as claimed in claim 1, wherein any reactive monomer having an appreciable solubility in the liquid medium at the polymerisation temperature is present in the said liquid as a particulate dispersion or as an emulsion.

3. A process as claimed in claim 1, wherein any by-product of the polymerisation reaction is capable of forming an azeotrope with the inert organic liquid medium or with a constituent thereof.

4. A process as claimed in claim 1, wherein the particle size of the monomer in dispersion is in the range $0.1-10\mu$.

5. A process as claimed in claim 1, wherein the monomer-stabilising agent contains a plurality of groups capable of becoming associated with the particles of the solid monomer, the said groups forming part of or being attached to a polymeric backbone to which the solvatable polymeric component is also attached.

6. A process as claimed in claim 5, wherein the polymeric backbone of the monomer-stabilising agent is flexible under the conditions of dispersing the solid monomer in the inert organic liquid.

7. A process as claimed in claim 1, wherein the solvatable polymeric group of the polymer-stabilising agent is of a similar type to the solvatable polymeric group of the monomer-stabilising agent.

8. A process as claimed in claim 1, wherein the grouping of the polymer-stabilising agent which effects association with the polymer is a polymeric grouping of similar composition to the polymer itself.

9. A process as claimed in claim 8, wherein the polymer-associating grouping of the polymer-stabilising agent is produced during the course of the polymerisation reaction by participation in that reaction of a reactive grouping present in the polymer-stabilising agent.

10. A process as claimed in claim 1, wherein there is used a single stabilising agent capable of acting as both monomer-stabilising agent and polymer-stabilising agent, the agent comprising (i) a solvatable polymeric component, (ii) a grouping capable of anchoring the agent to the particles of solid monomer and (iii) a grouping capable of effecting association of the agent with the polymer formed.

11. A process as claimed in claim 10, wherein reactive groups present in the single stabilising agent which are capable of participating in the polymerisation reaction are located in a portion of the molecule of the stabilising agent remote from the solvatable component thereof or from the grouping capable of anchoring the agent to the monomer particles.

12. A process as claimed in claim 1, wherein the polymer formed is a polyamide.

13. A process as claimed in claim 12, wherein there is used a single monomer which is the hexamethylene diamine salt of adipic acid.

14. A process as claimed in claim 12, wherein there is used a single monomer which is 11-aminoundecanoic acid.

15. A process as claimed in claim 10, wherein the single stabilising agent is a graft copolymer of which one polymeric component is a residue of poly-(12-hydroxystearic acid) or of poly-(tert.-butyl styrene) and another polymeric component is an ethyl acrylate copolymer containing a minor proportion of pendant carboxyl or glycidyl groups.

* * * * *